Oct. 16, 1956 T. B. PHILIP 2,766,904
VACUUM SUPPORTS
Filed Jan. 22, 1953 2 Sheets-Sheet 2

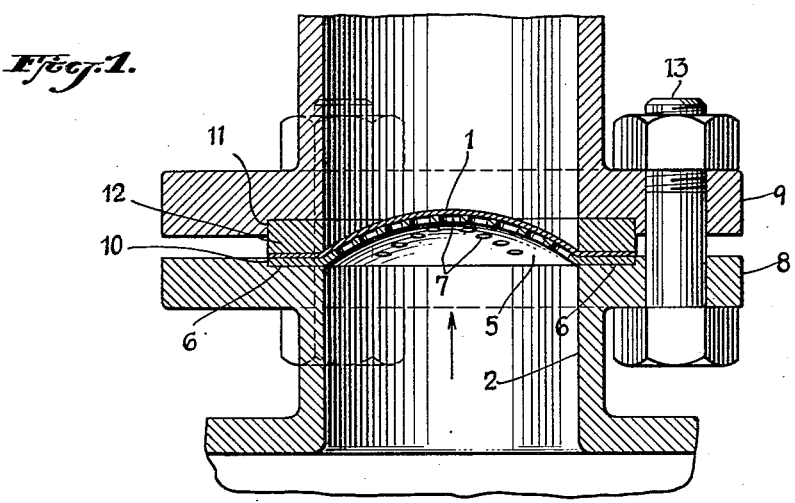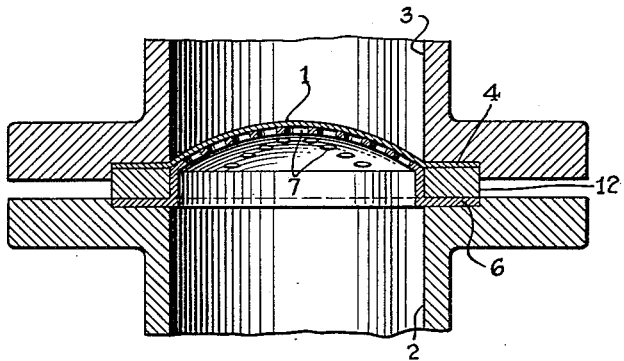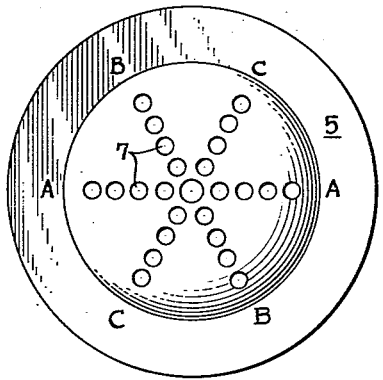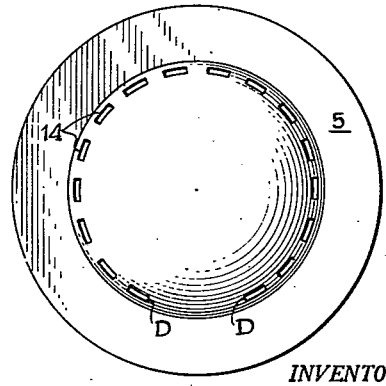

INVENTOR.
THOMAS BRUCE PHILIP
BY
ATTORNEYS.

United States Patent Office 2,766,904
Patented Oct. 16, 1956

2,766,904

VACUUM SUPPORTS

Thomas Bruce Philip, Effingham, England, assignor to The Distillers Company Limited, Edinburgh, Scotland, a British company Application January 22, 1953, Serial No. 332,727

Claims priority, application Great Britain February 1, 1952

6 Claims. (Cl. 220—89)

The present invention relates to pressure safety devices for pressure vessels and in particular to safety devices which will withstand changes and/or reversal of the fluid pressures acting thereon.

It is customary to fit pressure vessels by which expression is meant sealed reaction or other types of vessels in which the fluid pressure therein may be or may become greater than that of the surrounding atmosphere, with safety devices whereby the fluid content of the vessel may be released if the pressure of the fluid content thereof increases beyond a certain predetermined limit. In this way the danger of explosions of pressure vessels due to excess pressures may be eliminated.

Among such safety devices which have been used are dome-shaped frangible diaphragms which are arranged in connection with the pressure vessel so that the concave side of the diaphragm is directly connected to the inside of the pressure vessel and on the convex side of the diaphragm there is a free path through which fluid in the pressure vessel may escape should the diaphragm rupture. The diaphragm is so arranged in relation to the pressure vessel that an "air-tight" seal is effected between the fluid in the pressure vessel and the outside atmosphere which will withstand positive pressure differentials up to a certain predetermined value. By positive pressure differential across the diaphragm we mean the conditions in which the pressure on the concave side thereof is greater than the pressure on the convex side thereof, i. e. the pressure in the pressure vessel is greater than the pressure on the outer side of the diaphragm. When the positive pressure differential across the diaphragm increases beyond a certain predetermined value the diaphragm ruptures and thus provides an outlet for the fluid within the pressure vessel and the pressure therein is reduced.

The dome-shaped frangible diaphragms as described above may be made of any suitable material and, in general, are made of thin ductile metal and the positive pressure differential under which they will rupture is governed principally by the thickness of the material used, its tensile strength and the diameter of the diaphragm. Consequently, diaphragms which will burst at relatively low pressure differentials, for instance 3 atmospheres, are made from comparatively thin materials, for instance, metals.

It has previously been found that these relatively thin frangible diaphragms suffer from the disadvantage that they are damaged by negative pressure differentials, i. e. pressure differentials in which the pressure on the convex side of the diaphragm is greater than that on the concave side thereof and on subsequently being subjected to positive pressure differentials they will rupture at a pressure differential below that for which they were designed. This damage is caused by the distortion of the diaphragm which is relatively weak in compression on the convex side and it has been proposed to prevent this by fitting a vacuum support on its concave side. Such vacuum or negative pressure differentials may occur in pressure apparatus on cooling same after or during a pressure reaction or during the subsequent removal of the reaction products after the reaction is completed.

The vacuum supports which have been used hitherto consist essentially of a dome-shaped disc whose convex surface substantially fits the concave surface of the frangible diaphragm and thus supports the frangible diaphragm against deformation due to negative pressure differentials. It is essential that the vacuum support should be made stronger with regard to negative pressure differentials than the frangible diaphragm in order that it may support the latter against such negative pressure differentials.

It has been proposed to provide a dome support for a diaphragm having tongues slit into it. These cut-out tongues are so weak that they must be connected to one another by a disc and clips. The construction is expensive to manufacture, the parts of the dome must be assembled and the device is generally cumbersome.

The principal object of the invention accordingly is to provide a simple, efficient vacuum support for frangible diaphragms of the kind mentioned which shall be highly efficient in action and yet may be made inexpensively in one piece without the necessity of assembly and adjustment of various parts.

A further object of the present invention is to provide vacuum supports for use in collaboration with frangible diaphragms of safety devices of the type hereinbefore described, which will not impede the escape of fluid from the pressure vessel when the frangible diaphragm has ruptured, but which will support the frangible diaphragm against the damaging effect of negative pressure differentials.

A further object of the present invention is to provide vacuum supports which are made in one piece and therefore does not require any assembly of parts. Yet another object of the present invention is to provide vacuum supports which may be manufactured without skilled labor.

The invention accordingly comprises the novel apparatus and combination thereof, specific embodiments of which are described herein by way of example only and in accordance with the manner in which I now prefer to practice the invention.

Accordingly, the present invention provides a novel vacuum support for use in collaboration with a dome-shaped frangible diaphragm in a safety device of the type hereinbefore described, which comprises a dome-shaped disc whose convex surface substantially fits and supports the concave surface of the frangible diaphragm, said disc containing a plurality of perforations, so disposed as to form a line or lines of potential rupture such that the vacuum support will rupture along said line or lines when subjected to a positive pressure differential less than that at which the frangible diaphragm is designed to rupture.

The novel vacuum supports according to the present invention may be made of any suitable material and it is preferred to use materials which have been used heretofore in the manufacture of frangible diaphragms for safety devices, particularly ductile metals, such as nickel, silver, copper, certain types of stainless steel and other alloys. In order to support a frangible diaphragm against the effect of negative pressure differentials the vacuum support must be made of greater strength in compression on the convex surface than the frangible diaphragm. This may be achieved by making the support from the same materials as that used for the frangible diaphragm, but using a greater thickness thereof. Alternatively, the support may be made from a different material from that used for the frangible diaphragm provided that the thickness of the material is so chosen that the resultant support has sufficient strength.

The shape of the vacuum support is such that its convex surface substantially fits the concave surface of the frangible diaphragm and thus gives substantially all of its surface support against negative pressure differentials. There is substantially complete contact between the support and the diaphragm over their surfaces but the fluid in the pressure vessel is nevertheless able to exert its pressure on the diaphragm. In this way, any local indentations to the frangible disc which would weaken its resistance to positive pressure differentials can be prevented. In practice it is found that the dome-shaped frangible diaphragms of safety devices expand slightly under the influence of positive pressure differentials so that they take up the shape of a segment of a sphere under the effect of the working pressure within the pressure vessel. It is, therefore, preferred to make the shape of the vacuum support such that it substantially fits the concave surface of the frangible diaphragm when the latter has taken up its operating shape, i. e. its shape under the influence of the working pressure of the pressure vessel. In practice, in order to guard against the effect of slight pressure increases within the pressure vessel the frangible diaphragm and its vacuum support are preformed to a shape which corresponds to a pressure greater than the normal working pressure within the vessel but less than that at which the frangible diaphragm would rupture. When the vacuum support is shaped in this way it is found that it supports the frangible diaphragm in such a way that variations of the pressure in the pressure vessel slightly above and below its usual operating pressure do not cause damage to the diaphragm due to its expansion and contraction under the change of pressure, as has hitherto been the case.

The perforations in the novel vacuum supports of the present invention may have any desired size or contour so long as they fall along definite lines in the vacuum support so as to form lines of potential rupture and so long as they do not weaken the support to such an extent that it will no longer protect the frangible diaphragm against negative pressure differentials. Most suitably the perforations should take the form of rectangular slots running along the lines of potential rupture or of circular holes for in this way the resistance of the vacuum support to both positive and negative pressure differentials may be calculated.

By the expression "lines of potential rupture for a vacuum support" we mean that the said support will rupture along this line when subjected to a positive pressure differential less than that at which the frangible diaphragm it is to support is designed to rupture.

The lines of potential rupture of the novel vacuum supports of the present invention may run in any direction or directions, but it is preferred that they run either circumferentially or radially, since in these two dispositions the strength of the vacuum support may be calculated more easily. By circumferentially or radially is meant that in the circle constituting the plan view of the dome-shaped portion of the vacuum support, the line of potential rupture would appear to be either a circle concentric with said plan view circle or form a radius of said plan view circle.

It is further preferred that the vacuum supports of the present invention shall be so made that on rupture they will offer the minimum resistance to the escaping fluid. This may be achieved by making the support of such material and of such design that, when the frangible diaphragm ruptures and the outflow of the escaping fluid has ruptured the vacuum support along the line of potential rupture, then the support will be so weakened that it will fold back along the escape pipe of the safety device in the direction of the escaping fluid and will, therefore, offer the minimum resistance thereto. It is also within the scope of the present invention to provide vacuum supports containing lines of potential rupture as hereinbefore described, whose convex surface also contains grooves, recesses and/or perforations forming a line or lines of weakness about which the vacuum support or pieces of the vacuum support may fold when the line of potential rupture has ruptured under the influence of a positive pressure differential.

The novel vacuum supports of the present invention may be fixed in the safety device by any suitable means. Usually the dome-shaped frangible diaphragm of safety devices of the type described have an outwardly directed annular flange which is clamped by suitable clamping means within the safety device thus forming a seal across the escape pipe of the safety device. Most suitably therefore the vacuum supports of the present invention for use in collaboration with a frangible diaphragm bearing an outwardly directed annular flange possess a similar outwardly directed annular flange by which the vacuum support may be held in position in the safety device. The clamping means by which the vacuum support is held in position within the safety device is preferably the same as those which act on the frangible diaphragm although this must not be considered as a limiting feature. For instance, the vacuum support may be held in position with one side of a thin clamping ring while the frangible diaphragm is clamped against the other.

A further disadvantage of the relatively thin dome-shaped frangible diaphragms of the type hereinbefore described is that their intrinsic strength is not great and consequently they easily become distorted or otherwise damaged as a result of rough handling or packing or rough fitting into the body of the safety device with which they are to be used. Damage caused in this way may not prevent an air-tight seal being obtained, but may so weaken the diaphragm that a premature rupture at a positive pressure differential below that for which it was designed to rupture occurs.

We have found that a considerably strengthened frangible diaphragm may be provided by attaching thereto the novel vacuum support provided by the present invention. This combined frangible diaphragm and vacuum support has considerably greater intrinsic strength than the diaphragm alone with the result that it can withstand much rougher treatment in the way of handling, packing and fitting, without suffering any damage. The vacuum support may be attached to the frangible diaphragm by any suitable means, such as, for instance, an adhesive, rivets, bolts or spot welding, which do not interfere with the function of either the frangible diaphragm or the vacuum support. Most suitably, when the frangible diaphragm and the vacuum support both possess suitable corresponding outwardly directed annular flanges, they are attached together by any suitable means acting between the flanges. When rivets or bolts are used it is essential that they should not prevent the clamping means of the safety device from forming an "air-tight" seal with the combined diaphragm and vacuum support. This may be ensured by providing the clamping means with holes or recesses into which the ends of the rivets or bolts may fit, thus allowing the clamping means to act directly on the annular flanges. Alternatively the rivets or bolts may be disposed at the periphery of the annular flanges and the clamping means of the safety device may then be arranged to act only on the inner portions of the annular flanges.

In the accompanying drawings forming part of this application are shown embodiments of the apparatus of the invention as it is now preferred to practice it. In these drawings which are somewhat diagrammatic, Figure 1 is a vertical sectional view of a safety conduit with a frangible diaphragm, showing one form of vacuum support with perforations forming radial lines of potential rupture.

Figure 2 is a modified vertical section in which the vacuum support and diaphragm are held in position by opposite faces of the clamping ring.

Figure 3 is a plan view of the vacuum support dome shown in Figure 1.

Figure 4 is a similar showing to that in Figure 3 of a modified vacuum support including slit-like perforations.

Figure 5:
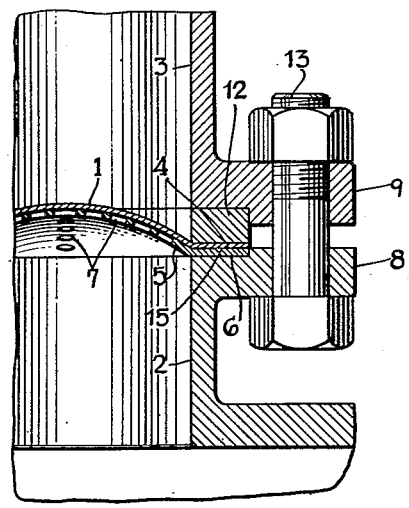
Figure 5 is a fragmentary vertical section like Figure 1 in which a vacuum support having two lines of potential rupture is attached to a frangible diaphragm by spot welding.

Referring now to Figure 1 the numeral 1 designates a flanged dome-shaped one-piece frangible diaphragm arranged to rupture at a predetermined positive differential pressure. The diaphragm as here shown is made of silver with a maximum diameter across the dome portion of 2 inches and such diaphragm will burst under a positive pressure differential of 145 p. s. i. (pounds per square inch), the thickness of the diaphragm being .003 inch. The differential pressure mentioned is that exerted by pressure from the interior of the pressure release sectional conduit designated by the numerals 2 and 3, that portion of the conduit designated as 3 being under atmospheric pressure while that designated as 2 being under super-atmospheric pressure or at times under a greater or less vacuum. The flange of the frangible diaphragm is designated as 4. The flanged dome-shaped support for the frangible diaphragm is designated as 5.

The flange therefor is designated as 6. The support is arranged to rupture at a somewhat lower differential pressure than the diaphragm and is prepared from metals such as nickel, here shown as nickel of about .01 inch thickness. Such support without any perforations would rupture at a positive pressure differential of approximately eight times greater than that required to rupture the silver diaphragm. It is therefore necessary to reduce its strength in tension in the ratio of 1:8 and this may be done by forming six radial lines of potential rupture running from the outer diameter of the domed portion of the support to its center so as to divide the support into six equal portions. The support and the diaphragm are in substantially complete contact with each other over their surfaces but the pressure occurring in section 2 which is connected with the pressure vessel (not shown) is nevertheless able to act on the diaphragm 1. The six radial lines of potential rupture are formed by holes or perforations 7 about 1/8 inch diameter with about 1/32 inch of metal left betwen each hole along the said lines. The vacuum support thus weakened will rupture at a positive pressure differential slightly less than that at which the silver diaphragm 1 will rupture, but it is strong enough in compression to sustain a negative pressure differential of 30 p. s. i. without deformation, and therefore has ample margin of strength to support the silver frangible diaphragm 1 from the effect of a vacuum in the pressure vessel to which it is connected.

The sections 2 and 3 are adapted to be aligned. Section 2 is provided with a circular flange 8 and section 3 with a circular flange 9. The upper face of the flange 8 is provided with an annular recess 10 into which the flange 6 of the vacuum support fits. The lower face of section 3 is provided with a recess 11 into which a clamping ring 12 is set. This ring as shown has its lower face resting on the upper face of the flange 4. When the parts are assembled and bolted together by the bolt 13, the ring 12 holds the diaphragm and vacuum support in air-tight relation. Instead of having the ring 12 rest on top of the flanges 4 and 6 it may be disposed between these flanges as in Figure 2.

In Figure 3 the potential lines of rupture A—A, B—B and C—C are shown as formed by the circular perforations 7 as described above. Instead of having lines of rupture as shown in Figure 3 the line of rupture D—D as shown in Figure 4 may be provided. As there shown they are made up of slit-like perforations 14 which are disposed in a partial circle concentric with its flanged dome 5 and its flange.

In the vacuum support 5 shown in Figures 1–4 the strength of the material from which they are made is so arranged that on rupture along the lines A—A, B—B, C—C and D—D the remaining parts of the vacuum supports will fold back along the lines A—B, B—C and C—A in one case and along D—D in the other, owing to the escaping fluid and consequently the ruptured disc will offer the minimum of resistance to such escaping fluid.

Figure 6:
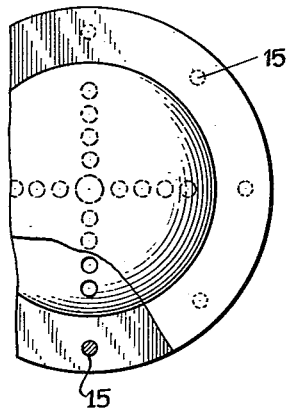
Figure 6 is a plan view of the vacuum support and diaphragm spot welded as in Figure 5.
Figure 7:
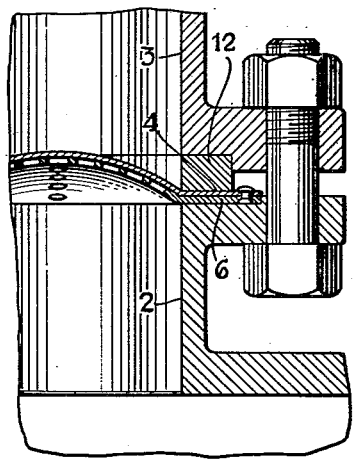
Figure 7 is a fragmentary showing of the vacuum support attached to the frangible diaphragm by rivets passing through the outer edge of the flanges of the vacuum support and diaphragm.

In order to make an integral structure of the diaphragm 1 and the support 5 the same may be spot welded between the flanges 4 and 6 respectively as shown in Figures 5 and 6. The spot welds are designated there by the numerals 15. Instead of spot welding as shown in Figure 7 the flanges 4 and 6 may be riveted together in which case the rivets pass through the flanges near their peripheries and beyond the ring 12 so that they do not interfere with the air-tight sealing of the sections 2 and 3.

Figure 8:
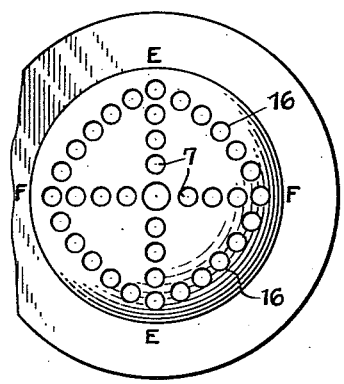
Figure 8 is a plan view of a vacuum support dome having two lines of potential rupture and in addition four lines of weakness about which the ruptured portions of the dome may fold.

The vacuum support shown in Figure 8 has two lines of potential rupture E—E and F—F made up by the perforations 7 and in addition it possesses the four lines of weakness E—F made up by the perforations 16. In practice when the support ruptures the remaining four portions of the vacuum support fold back along the aforementioned lines of weakness E—F owing to the escaping fluid and consequently the ruptured disc will offer the minimum of resistance to such escaping fluid.

I claim:

1. A safety device comprising in combination a thin rounded dome-shaped diaphragm arranged to rupture at a predetermined positive differential pressure existing between the convex and concave surfaces thereof and a one-piece rounded dome-shaped support therefor having a convex surface fitting into the concave surface of the diaphragm constituting the sole support for the dome portion of said diaphragm arranged to rupture at a somewhat lower positive differential pressure, said support being capable of withstanding greater negative pressure differentials than said diaphragm but provided with a plurality of perforations arranged in a pattern so disposed to form a line of potential rupture under said lower positive pressure whereby substantial unobstructed discharge of contents from said device is effected.

2. A safety device comprising in combination a flanged dome-shaped frangible diaphragm arranged to rupture at a predetermined positive differential pressure existing between the convex and concave surfaces thereof, and a one-piece flanged dome support therefor having a convex surface fitting into the concave surface of the diaphragm constituting the sole support for the dome portion of said diaphragm arranged to rupture at a somewhat lower positive differential pressure, said support being capable of withstanding greater negative pressure differentials than said diaphragm but provided with a plurality of perforations arranged in a plattern to form a line of potential rupture under said lower positive pressure whereby substantial unobstructed discharge of contents from said device is effected.

3. An apparatus as claimed in claim 1, wherein the line of potential rupture runs circumferentially around the dome-shaped support.

4. An apparatus as claimed in claim 1, wherein the line of potential rupture runs radially in the dome-shaped disc.

5. A vacuum support and frangible diaphragm as claimed in claim 1, said vacuum support bearing an outwardly directed annular flange by means of which the vacuum support may be held in position in the safety device.

6. A vacuum support and frangible diaphragm as claimed in claim 2, wherein the diaphragm is attached to the vacuum support.

References Cited in the file of this patent
UNITED STATES PATENTS

| | | |
|---|---|---|
| 2,123,662 | Raymond | July 12, 1938 |
| 2,523,068 | Simpson | Sept. 19, 1950 |
| 2,586,858 | Parsons | Feb. 26, 1952 |